United States Patent
Chen et al.

(10) Patent No.: US 10,237,193 B2
(45) Date of Patent: Mar. 19, 2019

(54) PRIORITIZING SHORT-RANGE WIRELESS PACKETS FOR TIME-SENSITIVE APPLICATIONS

(71) Applicant: Apple Inc., Cupertino, CA (US)

(72) Inventors: Camille Chen, Cupertino, CA (US); Siegfried Lehmann, Sunnyvale, CA (US); Hsin-Yao Chen, Sunnyvale, CA (US); Wenping Lou, Beijing (CN)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 15/062,360

(22) Filed: Mar. 7, 2016

(65) Prior Publication Data

US 2017/0093727 A1 Mar. 30, 2017

Related U.S. Application Data

(60) Provisional application No. 62/235,528, filed on Sep. 30, 2015.

(51) Int. Cl.
*H04L 12/26* (2006.01)
*H04L 12/853* (2013.01)
(Continued)

(52) U.S. Cl.
CPC ...... *H04L 47/2416* (2013.01); *H04L 65/4069* (2013.01); *H04W 4/80* (2018.02);
(Continued)

(58) Field of Classification Search
None
See application file for complete search history.

(56) References Cited

U.S. PATENT DOCUMENTS 7,844,222 B2 11/2010 Grushkevich
7,853,207 B2 12/2010 Harada et al.
(Continued)

FOREIGN PATENT DOCUMENTS

WO WO 2015199584 A1 * 12/2015 ............ H04L 47/24

OTHER PUBLICATIONS

Sataraddi et al., "Priority Based Scheduler for Bluetooth Network", Jan. 18-19, 2013, 10 pages, Springer Berlin Heidelberg, Mumbai, India.
(Continued)

*Primary Examiner* — Anh Vu H Ly
(74) *Attorney, Agent, or Firm* — Meyertons Hood Kivlin Kowert & Goetzel, P.C.; Jeffrey C. Hood; Matthew C. Washburn

(57) ABSTRACT

In embodiments, a client station operates to identify and prioritize time-sensitive short-range wireless packets, such as time-sensitive Bluetooth Low Energy (BTLE) packets, in a congested wireless environment. The client station may identify time-sensitive packets using, e.g., the type of device providing the packets, a state of the device providing the packets, and/or the type of data included in the packets. The client station may prioritize the time-sensitive packets in various ways, including by providing priority scheduling to the time-sensitive packets; pausing communication of other types of Bluetooth packets, such as A2DP packets; reducing a data rate of other types of Bluetooth packets, such as A2DP packets; and/or extending a data packet size of time-sensitive BTLE packets. The time-sensitive packets may thus be prioritized over packets associated with the same wireless protocol and/or a different wireless protocol.

20 Claims, 12 Drawing Sheets

(51) Int. Cl.
  *H04W 76/10* (2018.01)
  *H04W 4/80* (2018.01)
  *H04L 29/06* (2006.01)
  *H04W 72/12* (2009.01)
  *H04W 84/12* (2009.01)
(52) U.S. Cl.
  CPC ... *H04W 72/1242* (2013.01); *H04W 72/1263* (2013.01); *H04W 76/10* (2018.02); *H04W 84/12* (2013.01)

(56) References Cited

U.S. PATENT DOCUMENTS

| | | | |
|---|---|---|---|
| 8,804,690 B1 | 8/2014 | Wheeler et al. | |
| 2005/0201403 A1* | 9/2005 | Wang | H04L 47/24 370/412 |
| 2007/0098004 A1 | 5/2007 | Lath | |
| 2007/0238475 A1 | 10/2007 | Goedken | |
| 2009/0257379 A1* | 10/2009 | Robinson | H04W 16/14 370/329 |
| 2012/0182939 A1 | 7/2012 | Rajan et al. | |
| 2012/0207063 A1 | 8/2012 | Shaw | |
| 2013/0005262 A1 | 1/2013 | Sakata | |
| 2013/0163531 A1 | 6/2013 | Kim | |
| 2013/0182650 A1* | 7/2013 | Kezys | H04W 72/1221 370/329 |
| 2014/0039804 A1* | 2/2014 | Park | A61B 5/0002 702/19 |
| 2014/0172362 A1* | 6/2014 | Burton | G01D 4/002 702/160 |
| 2015/0036573 A1* | 2/2015 | Malik | H04W 52/0254 370/311 |
| 2015/0237641 A1 | 8/2015 | Sahu et al. | |
| 2016/0014547 A1* | 1/2016 | Yae | H04W 4/008 455/418 |
| 2016/0066137 A1* | 3/2016 | Kulkarni | H04W 4/008 455/456.1 |
| 2016/0066339 A1* | 3/2016 | Jakoby | H04W 72/1215 455/553.1 |
| 2016/0142868 A1* | 5/2016 | Kulkarni | H04W 4/008 455/456.5 |
| 2016/0205592 A1* | 7/2016 | Koskinen | H04W 28/08 370/230 |
| 2016/0262082 A1* | 9/2016 | Flynn | H04W 48/18 370/338 |
| 2016/0262191 A1* | 9/2016 | Flynn | H04W 76/02 370/338 |
| 2016/0262205 A1* | 9/2016 | Flynn | H04W 52/0212 370/338 |
| 2016/0277315 A1* | 9/2016 | Miller | H04L 67/322 370/338 |
| 2017/0180939 A1* | 6/2017 | Kulkarni | H04W 4/025 370/338 |

OTHER PUBLICATIONS

Search Report for Singaporean Patent Application No. 10201605110X, dated Mar. 24, 2017, 3 pages.

* cited by examiner

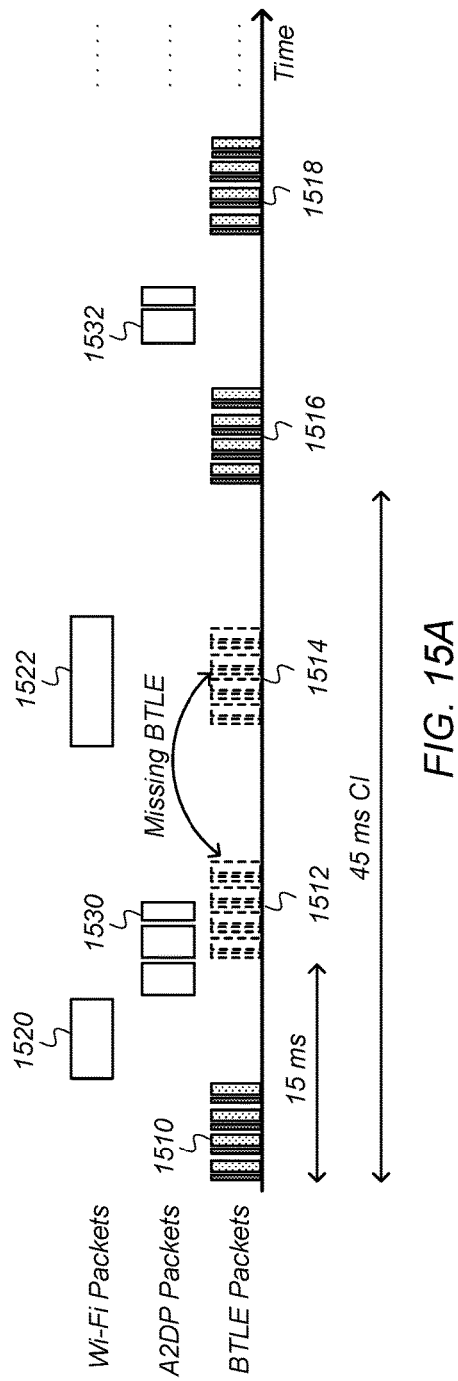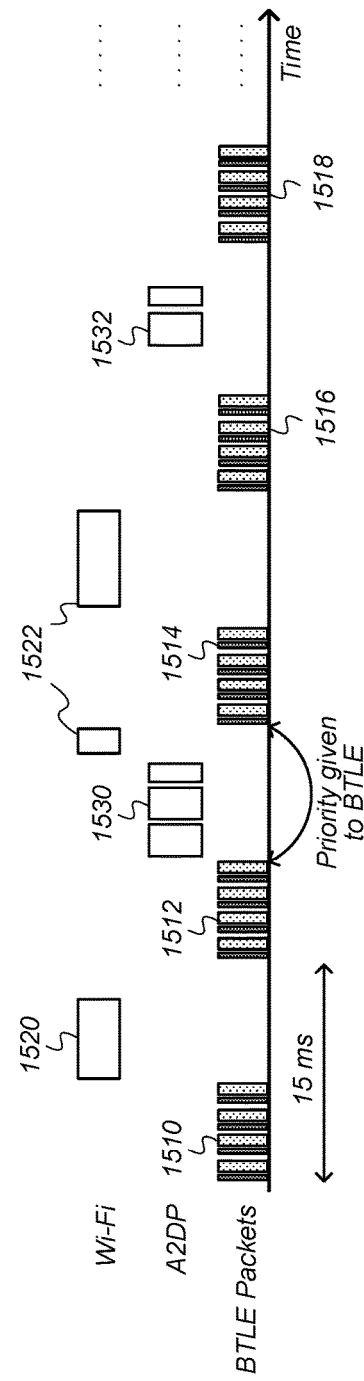
FIG. 15A
FIG. 15B

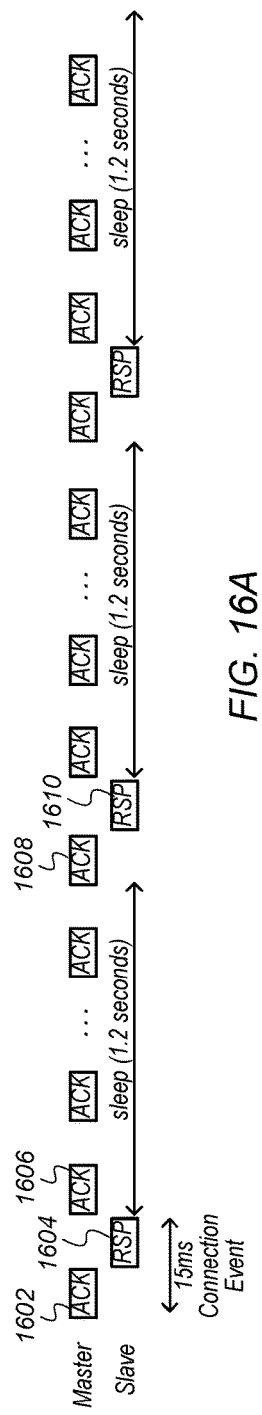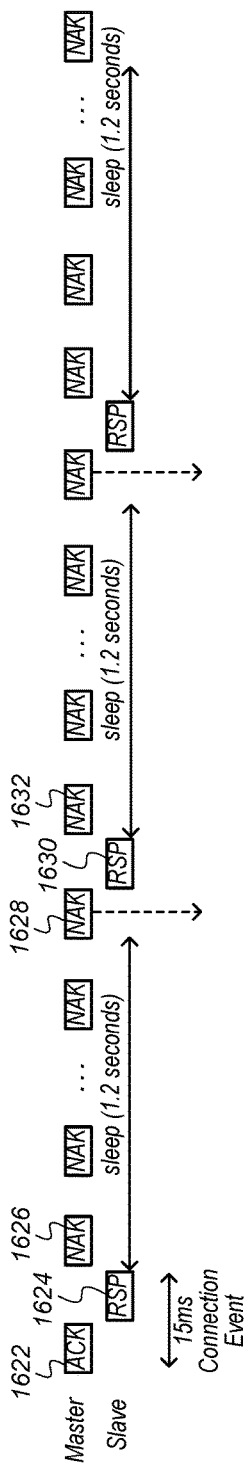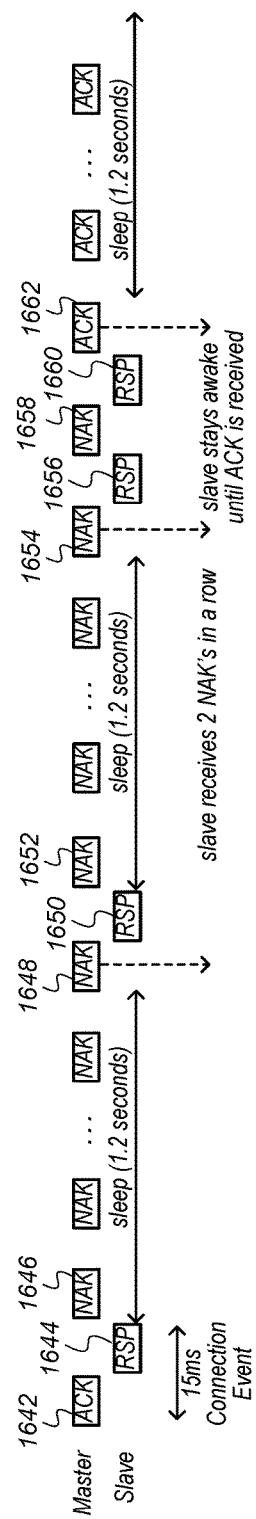

PRIORITIZING SHORT-RANGE WIRELESS PACKETS FOR TIME-SENSITIVE APPLICATIONS

PRIORITY INFORMATION

This application claims priority to U.S. provisional patent application Ser. No. 62/235,528, entitled "Prioritizing Bluetooth Packets for Time-Sensitive Applications," by Camille Chen, et al., filed Sep. 30, 2015, which is hereby incorporated by reference in its entirety as though fully and completely set forth herein.

FIELD

The present application relates to wireless communications, including techniques for wireless communication between wireless stations and accessory devices in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "wireless stations", "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers, video game systems, or other entertainment devices.

Another popular short range wireless communication standard is Bluetooth ("BT"), including the Bluetooth Low Energy ("BTLE") protocol. Bluetooth communications are particularly popular for connecting wireless devices to various accessory devices, such as headsets, headphones, speakers, keyboards, mice, trackpads, styluses, remote controls, game controllers, wearable devices (e.g., smart watches or smart glasses), home automation devices, etc. Bluetooth may also be used to provide communications between wireless devices, such as to stream audio/video content for display from a mobile device to a smart television, digital media player, or other entertainment device; or to transfer user files or other data directly between wireless devices.

Wi-Fi and Bluetooth both occupy a section of the 2.4 GHz ISM frequency band. As Bluetooth-enabled accessories become increasingly prolific for use in communicating with Wi-Fi-enabled wireless stations, congestion of this frequency band also increases. This may lead to increased communications latency, as scheduling constraints and interference cause communications packets to be delayed or retransmitted.

SUMMARY

Embodiments described herein relate to systems and methods of prioritizing time-sensitive Bluetooth communications.

Some embodiments relate to methods for communicating data packets between an accessory device and a client station. The client station may establish communications with a plurality of accessory devices, determine that communications with a first accessory device of the plurality of accessory devices are time-sensitive communications, and prioritize the communications with the first accessory device in response to the determining that the communications with the first accessory device are time-sensitive communications. The communications with the first accessory device may include Bluetooth Low Energy (BTLE) communications.

The client station may determine that the communications with the first accessory device are time-sensitive by determining that the first accessory device is a remote control configured to control the client station. The client station may further determine that a microphone of the remote control is active for receiving voice commands. The client station may further determine that the communications with the first accessory device include audio data.

The client station may determine that the communications with the first accessory device are time-sensitive by determining that the first accessory device is a stylus. The client station may further determine that the stylus is in a low-latency mode.

The client station may determine that the plurality of accessory devices includes at least a threshold number of accessory devices. The prioritizing the communications with the first accessory device may be further in response to the determining that the plurality of accessory devices includes at least the threshold number of accessory devices.

The prioritizing the communications with the first accessory device may further include scheduling one or more packets of the communications with the first accessory device during successive connection intervals, wherein one or more packets of communications with another accessory device of the plurality of accessory devices are delayed to allow for the scheduling the one or more packets of the communications with the first accessory device.

The client station may determine that communications with another accessory device of the plurality of accessory devices include Advanced Audio Distribution Profile (A2DP) packets, wherein the prioritizing the communications with the first accessory device includes pausing the A2DP packets until the first accessory device has completed sending its available data. Alternatively, or additionally, the prioritizing the communications with the first accessory device includes reducing a data rate of the A2DP packets.

The prioritizing the communications with the first accessory device may include extending a data packet size for one or more BTLE packets of the communications with the first accessory device.

The client station may receive a communication packet from the first accessory device. In response, the client station may transmit an acknowledgement packet. The first accessory device may be configured to remain in an active state until receiving the acknowledgement packet.

Some embodiments relate to wireless stations, such as the client station described above, configured to perform any of the steps or actions described herein.

Some embodiments relate to computer-readable media storing software instructions executable by one or more processors of a wireless communications device to cause the wireless communications device to perform any of the steps or actions described herein.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 15A and 15B illustrate scenarios in which BTLE packets are processed as low-priority packets and as high-priority packets in a congested wireless environment, according to some embodiments; and FIGS. 16A through 16C illustrate example Bluetooth communication scenarios between a master device and a slave device, according to some embodiments.

Figure 1:
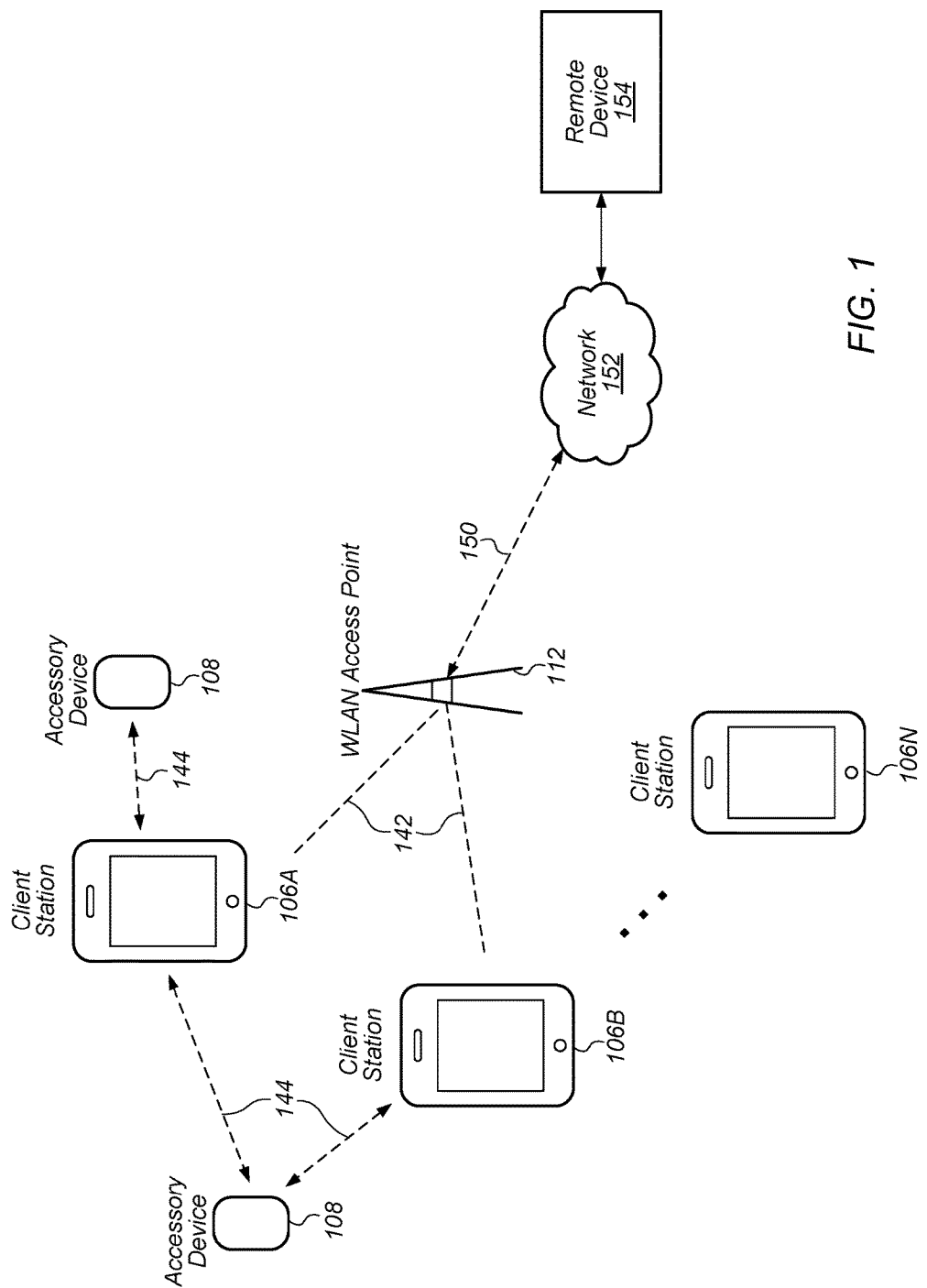
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

AP: Access Point
A2DP: Advanced Audio Distribution Profile
BT: Bluetooth
BTLE: Bluetooth Low Energy
MAC: Media Access Control
TX: Transmission/Transmit
RX: Reception/Receive
LAN: Local Area Network
WLAN: Wireless LAN
RAT: Radio Access Technology

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices that are mobile or portable and which perform wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices that performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

Accessory Device—any of various types of electronic devices configured to communicate with a wireless device, as defined above, using a short- or medium-range wireless communication protocol to enhance the capabilities of the wireless device. An accessory device may communicate with a wireless device using any of various communications protocols, such as Wi-Fi or Bluetooth. Examples of accessory devices include headsets, headphones, speakers, keyboards, mice, trackpads, styluses, remote controls, game controllers, wearable devices (e.g., smart watches or smart glasses), home automation devices, etc.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—WLAN System

FIG. 1 illustrates an example WLAN system according to some embodiments. As shown, the exemplary WLAN system includes one or more wireless client stations or devices, or user equipment (UEs), 106A-106N, such as mobile devices, set-top boxes, media devices, game consoles, etc., that are configured to communicate over a wireless communication channel 142 with an Access Point (AP) 112, such as a Wi-Fi access point. The one or more wireless client stations 106 may communicate with the AP 112 according to any of various communication standards, such as the various IEEE 802.11 standards. The AP 112 may communicate via a wired or wireless communication channel 150 with one or more other electronic devices (not shown) and/or a network 152, such as the Internet. Additional electronic devices, such as the remote device 154, may communicate with components of the WLAN system via the network 152. For example, the remote device 154 may be another wireless client station.

In some embodiments, at least one client station 106 (e.g., 106N) is configured to communicate directly with one or more neighboring client stations (e.g., 106B), without use of the access point 112.

As shown, the exemplary WLAN system also includes one or more accessory devices 108 that are configured to communicate over a wireless communication channel 144 with one or more of the wireless client stations 106. The one or more accessory devices may communicate with the client stations 106 using any of various communications standards, such as the various IEEE 802.11 standards or the Bluetooth standards.

One or more of the client station 106, the access point 112, and/or the accessory device 108 may be configured to prioritize time-sensitive communications with one or more other wireless communications devices as described further below.

Figure 2:
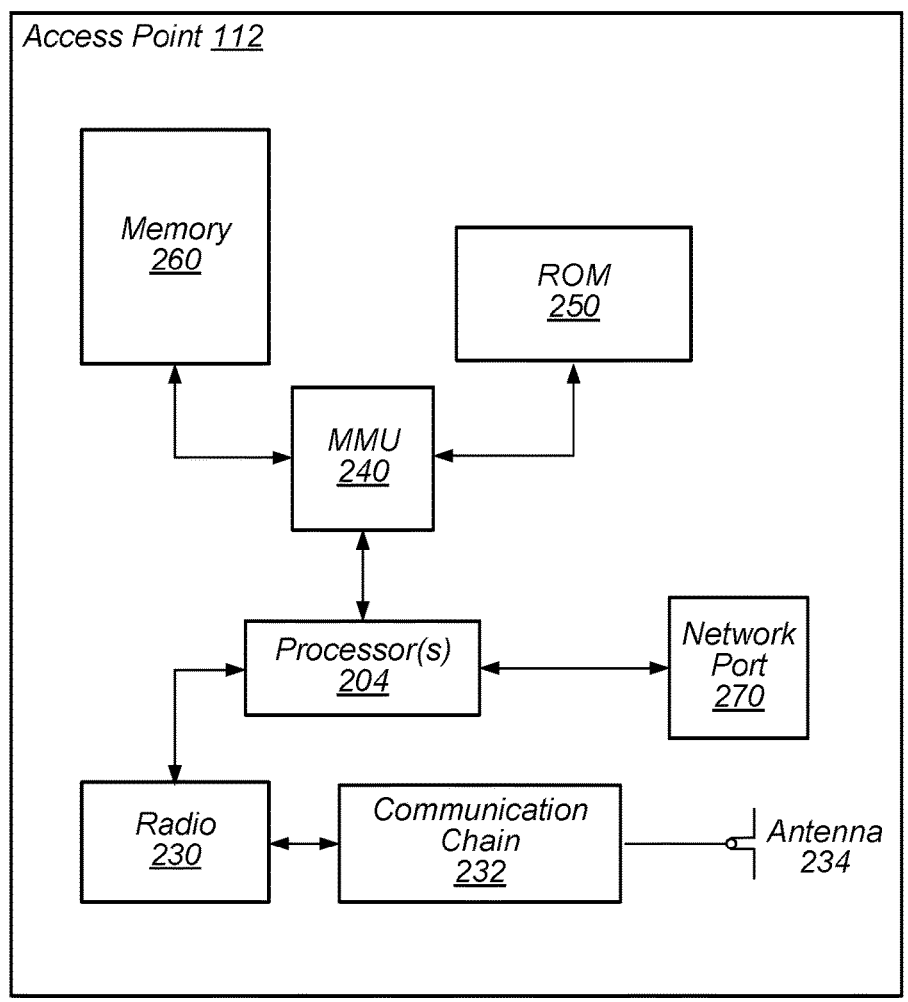
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices. Note that processor(s) 204 may include one or more processing elements. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

The AP 112 may include at least one network port 270. The network port 270 may be configured to couple to a wired network and provide a plurality of devices, such as client stations 106, access to the Internet. For example, the network port 270 (or an additional network port) may be configured to couple to a local network, such as a home network or an enterprise network. For example port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with client station 106 via wireless communication circuitry (or radio) 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. Any 802.11 protocol may be used, including 802.11a, b, g, n, ac, and ax. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

The AP 112 may include hardware and software components for prioritizing time-sensitive communications as described further below.

Figure 3:
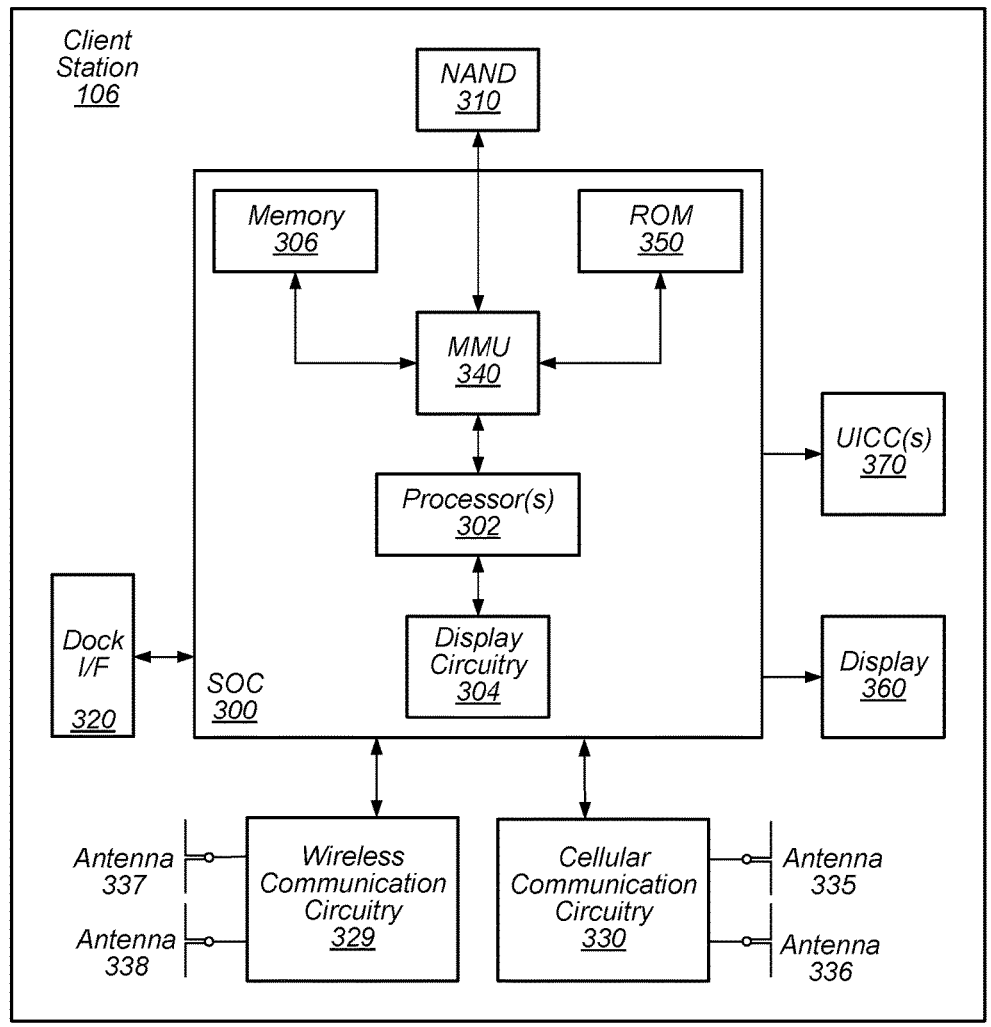
FIG. 3 illustrates an example simplified block diagram of a client station, according to some embodiments.

FIG. 3—Client Station Block Diagram

FIG. 3 illustrates an example simplified block diagram of a client station 106. According to various embodiments, client station 106 may be a user equipment device (UE), a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (or dock I/F) 320 (e.g., for coupling to a computer system, dock, charging station, television, Ethernet, etc.), the display 360, cellular communication circuitry 330 such as for LTE, GSM, etc., and/or short to medium range wireless communication circuitry 329 (e.g., Bluetooth and/or WLAN circuitry). The client station 106 may further include one or more smart cards 370 that include SIM (Subscriber Identity Module) functionality, such as one or more UICC(s) (Universal Integrated Circuit Card(s)) cards 370. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302 which may execute program instructions for the client station 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly with one or more accessory devices. For example, the client station 106 may be configured to communicate with the one or more accessory devices according to a Bluetooth RAT, as shown in FIG. 1.

As described herein, the client station 106 may include hardware and software components for implementing the features described herein. Specifically, the client station 106 may include hardware and software components for prioritizing time-sensitive communications as described further below. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the client station 106, in conjunction with one or more of the other components 300, 304, 306, 310, 320, 239, 330, 335, 336, 337, 338, 340, 350, 360, and 370 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 304.

Further, as described herein, cellular communication circuitry 330 and short range wireless communication circuitry 329 may each include one or more processing elements. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329. Each integrated circuit may further include memory storing software instructions to be executed by the processing elements.

Figure 4:
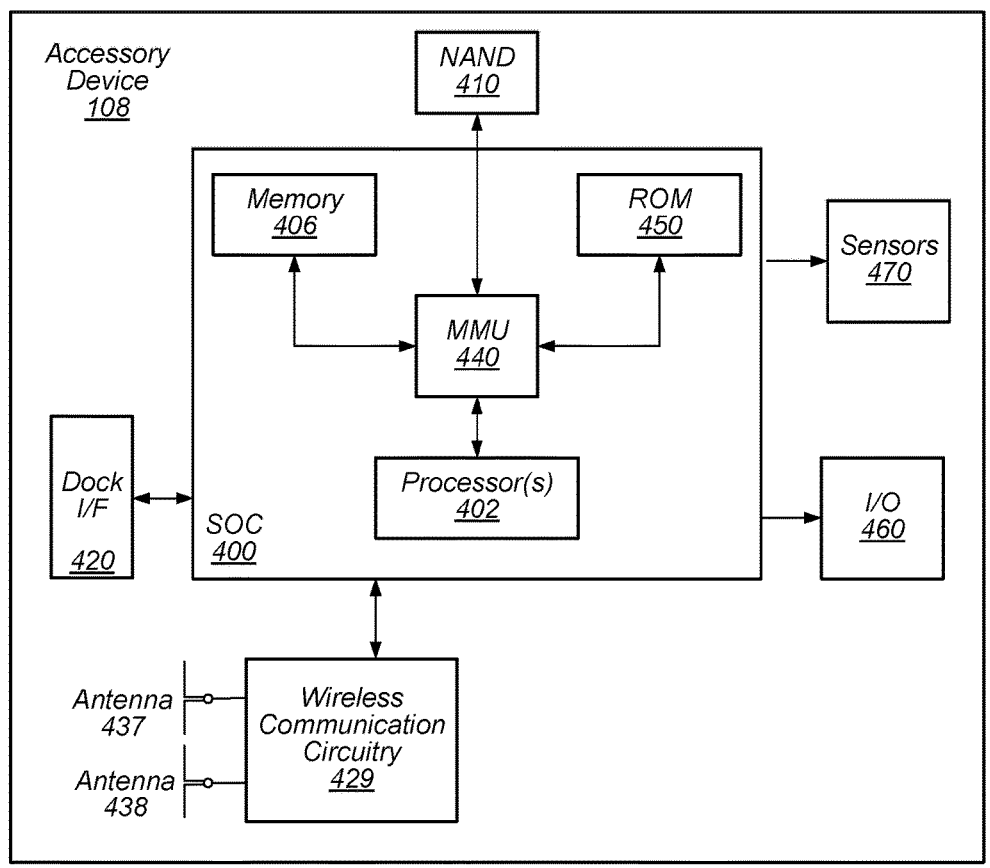
FIG. 4 illustrates an example simplified block diagram of an accessory device, according to some embodiments.

FIG. 4—Accessory Device Block Diagram

FIG. 4 illustrates an example simplified block diagram of an accessory device 108. As shown, the accessory device 108 may include a system on chip (SOC) 400, which may include portions for various purposes. The SOC 400 may be coupled to various other circuits of the accessory device 108. For example, the accessory device 108 may include various types of memory (e.g., including NAND flash 410), a connector interface (or dock I/F) 420 (e.g., for coupling to a computer system, dock, charging station, television, Ethernet, etc.), input/output (I/F) interfaces 460, short to medium range wireless communication circuitry 429 (e.g., Bluetooth and/or WLAN circuitry), and/or sensors 470. The short to medium range wireless communication circuitry 429 may couple to one or more antennas, such as antennas 437 and 438 as shown. The short to medium range wireless communication circuitry 429 may include multiple receive chains and/or multiple transmit chains for receiving and/or transmitting multiple spatial streams, such as in a multiple-input multiple output (MIMO) configuration.

As shown, the SOC 400 may include processor(s) 402 which may execute program instructions for the accessory device 108. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the short range wireless communication circuitry 429, connector interface (I/F) 420, and/or I/O interfaces 460. The MMU 440 may be configured to perform memory protection and page table translation or set up. In some embodiments, the MMU 440 may be included as a portion of the processor(s) 402.

The I/O interfaces 460 may include one or more of any of numerous input and/or output interfaces, such as display screens, touch screens, buttons, switches, dials, speakers, microphones, haptic feedback generators, cameras, etc. The sensors 470 may include one or more of any of numerous sensors, such as force sensors, pressure sensors, motion sensors, gyroscopes, accelerometers, compasses, thermometers, barometers, photodetectors, chemical sensors, proximity detectors, etc.

As noted above, the accessory device 108 may be configured to communicate wirelessly with one or more client stations. For example, the accessory device 108 may be configured to communicate with the one or more client stations according to a Bluetooth RAT, as shown in FIG. 1.

Various accessory devices may differ significantly from other accessory devices in form and function. It should be understood that an accessory device 108 may include any combination or subset of the features shown in FIG. 4.

As described herein, the accessory device 108 may include hardware and software components for implementing the features described herein. Specifically, the accessory device 108 may include hardware and software components for prioritizing time-sensitive communications as described further below. For example, the processor 402 of the accessory device 108 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the accessory device 108, in conjunction with one or more of the other components illustrated may be configured to implement part or all of the features described herein as being performed by an accessory device.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 404.

Further, as described herein, short range wireless communication circuitry 429 may include one or more processing elements. Thus, short range wireless communication circuitry 429 may include one or more integrated circuits (ICs) that are configured to perform the functions of short range wireless communication circuitry 429. In addition, each integrated circuit may include circuitry (e.g., first circuitry, second circuitry, etc.) configured to perform the functions of short range wireless communication circuitry 429. Each integrated circuit may further include memory storing software instructions to be executed by the processing elements.

Bluetooth/Wi-Fi Use Cases

The number and variety of accessory devices utilizing Bluetooth to communicate with wireless stations is increasing. This is leading to increased congestion and latency for communications in the 2.4 GHz ISM band, which is used by Bluetooth and Wi-Fi. At the same time, many newer accessory devices demand higher levels of performance than previous generations of accessory devices.

Previously, when designing wireless environments and wireless stations, the following assumptions were typical:

A wireless station usually has one shared antenna for both Wi-Fi and Bluetooth, so Wi-Fi and Bluetooth must implement time sharing (TDD).

A wireless station usually attempts to connect with only one Bluetooth device at any given time.

A wireless station acts as a Bluetooth slave (a controlled device) when it is connected to a Bluetooth headset, if the Bluetooth headset initiates the connection. The mobile device will typically not request a role switch.

A Bluetooth headset should keep the highest priority to minimize the latency. Regardless of the operating condition of the headset, it is assumed to have a need to maintain a high data rate.

BTLE uses a best effort approach, as the data is not sent on a fixed schedule.

The minimum available channels are not as stringent for BTLE as for classical Bluetooth, because a BTLE device is likely to be in a remote area.

A BTLE packet is small, as it includes only a small amount of data. A typical example may be a packet from a sensor, such as a health sensor.

The preceding assumptions have sometimes resulted in compromised performance in wireless environments. Moreover, these assumptions do not accommodate the increasing demands on function and performance of mobile stations and accessory devices. For example, use cases are developing in which a wireless station (even a mobile station) may maintain multiple Bluetooth connections simultaneously. Additionally, BTLE is no longer limited to small packets, such as those from sensors. Instead, BTLE is being used (e.g., either with or without a length extension feature) for higher-data-rate applications, such as transmitting real-time voice commands from accessory devices. Furthermore, BTLE is being used to transmit extremely time-sensitive data, such as the previously mentioned voice commands, stylus input, and/or game controller input.

Table 1 illustrates data rates that may be achieved using various configurations of BTLE.

TABLE 1

| BTLE (1 Msps and 2 Msps) Packet Size | | | | | |
|---|---|---|---|---|---|
| Symbol Rate | Data Length | Overhead | Total Packet Length with overhead | Packet Repetition Rate including 2 * TIFS + 80 us for 1 Msps and 44 us for 2 Msps Ack | L2CAP Application Data Rate (Overhead removed) |
| 1 Msps | 27 bytes | 14 bytes | 41 bytes = 328 us | 708 us | 305 kbps |
| 2 Msps | 27 bytes | 15 bytes | 42 bytes = 188 us | 512 us | 422 kbps |
| 1 Msps + Length Extension | 251 bytes | 14 bytes | 265 bytes = 2120 us | 2500 us | 803 kbps |
| 2 Msps + Length Extension | 251 bytes | 15 bytes | 266 bytes = 1064 us | 1408 us | 1426 kbps |

Figure 5:
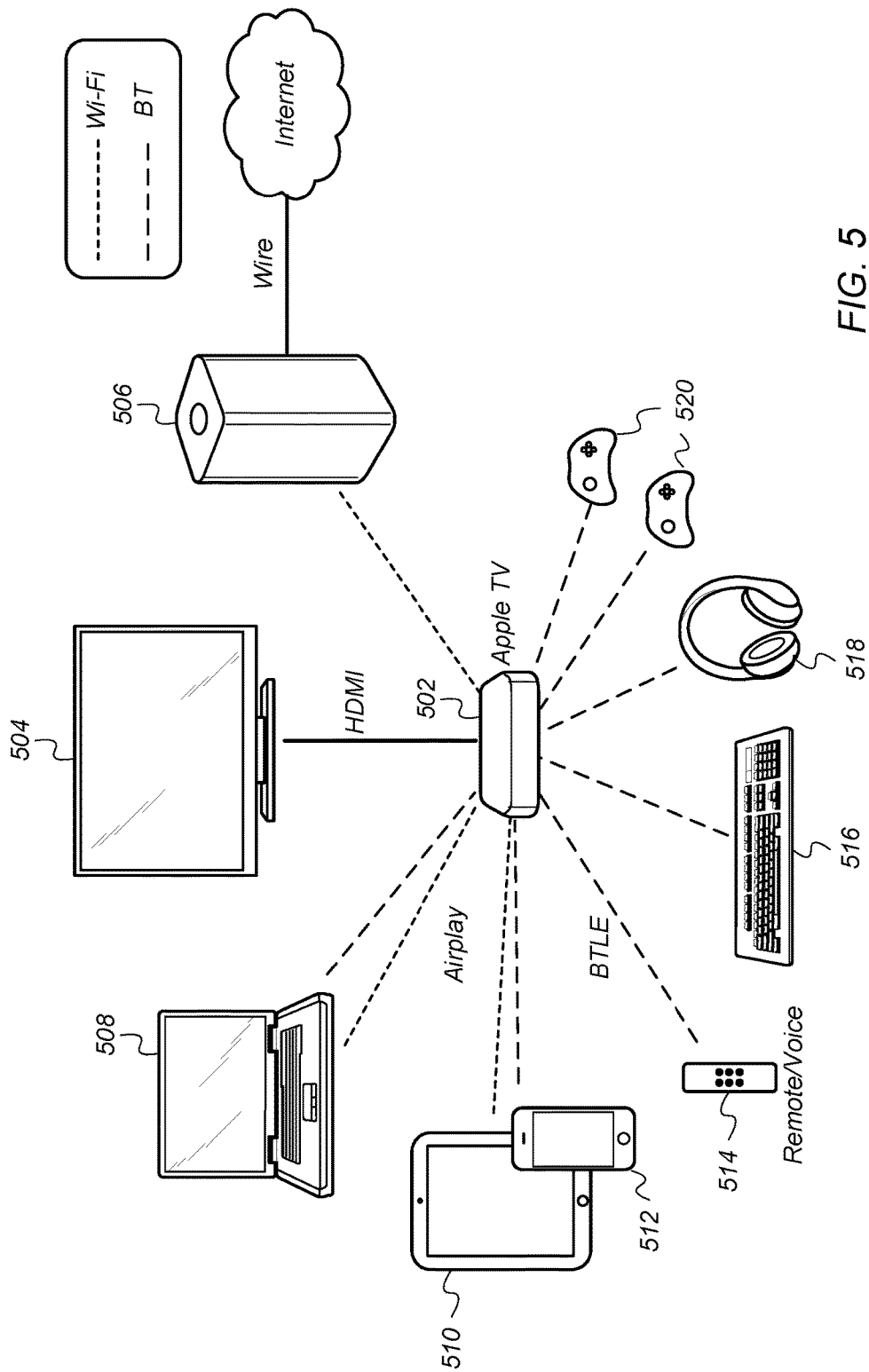
FIG. 5 illustrates an example scenario in which a wireless client station may demand low latency communications with accessory devices in a congested wireless environment, according to some embodiments.

FIG. 5 illustrates an example scenario in which a digital media player 502 (e.g., an Apple TV™, by Apple Inc.), or other computing or entertainment device, may demand low latency communications with accessory devices in a congested environment. The digital media player 502 may be or include an example of a client station 106. The digital media player 502 may be configured to provide audio/video data from various sources to a television 504, e.g., via a wired or wireless connection. As one example, the digital media player 502 may provide audio/video data from the Internet, e.g., via an AP 506. In some instances, the digital media player 502 may communicate with the AP 506 using Wi-Fi. As another example, the digital media player 502 may provide audio-video data from a local device, such as a laptop computer 508, tablet computer 510, or smart phone 512. In some instances, the digital media player 502 may communicate with a local device using Wi-Fi and/or Bluetooth.

The digital media player 502 may additionally, or alternatively, communicate wirelessly with one or more accessory devices, e.g., using Bluetooth. As shown in FIG. 5, the digital media player 502 may wirelessly communicate with a remote control 514, keyboard 516, headphones 518, and/or game controllers 520, among other possible accessory devices.

A user may expect or demand low latency in communications with one or more of these accessory devices. For example, a game controller 520 may transmit to the digital media player 502 signals representing user inputs (e.g., button presses) for controlling a game running on the digital media player 502. High latency in such communications may result in a degraded user experience in the game, as the inputs are received late.

As another example, the remote control 514 may transmit to the digital media player 502 signals representing physical user inputs (e.g., button presses, trackpad gestures, motion gestures) and/or voice commands for controlling the digital media player 502. For example, the remote control 514 may include a microphone for accepting speech from a user. The remote control 514 may transmit the speech to the digital media player 502, which may interpret the speech, or which may transmit the speech to a remote server (not shown) for interpretation, e.g., via the AP 506. The digital media player 502 and/or the remote server may include digital assistant functionality (e.g., Siri, by Apple Inc.) configured to respond to the interpreted speech, such as by executing commands at the digital media player 502 (e.g., playback control commands, content search commands), performing Internet searches, interfacing with network-based functions (e.g., communication functions, home automation functions), etc. The user may expect or demand that such responses to verbal commands occur without noticeable delay. Therefore, high latency in communications between the remote control 514 and the digital media player 502 may result in an unsatisfactory user experience.

Figure 6:
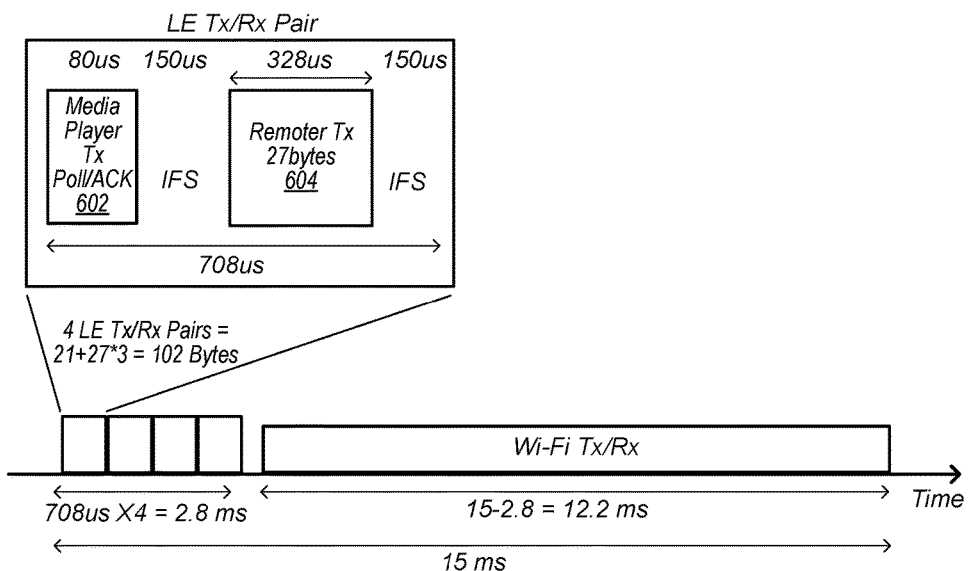
FIGS. 6-9 provide example timing diagrams for communications between a client station and a remote control, according to some embodiments.

FIG. 6-9 provide examples of communications timing involving a remote control, such as the remote control 514 described above. FIG. 6 illustrates scheduling of BTLE and Wi-Fi communications by the digital media player 502. As shown, a BTLE connection interval between the remote control 514 and the digital media player 502 may be 15 ms. BTLE communications between the two devices may include one or more BTLE TX/RX pairs. For example, the digital media player 502 may transmit a first BTLE packet 602, including polling and/or acknowledgement (ACK) of a previously received BTLE packet. The first BTLE packet may be received by the remote control 514. As shown, the first BTLE packet may have a duration of 80 us. Following an inter-frame space (IFS), which may have a duration of 150 us, the remote control 514 may transmit a second BTLE packet 604, including data. The second BTLE packet may be received by the digital media player 502. As shown, the second BTLE packet may include 27 bytes of data, and may have a duration of 328 us. The second BTLE packet may be followed by another IFS, which may have a duration of 150 us. Thus, a BTLE TX/RX pair may have a total duration of 708 us.

Following the one or more BTLE TX/RX pairs, some or all of the time remaining in the BTLE connection interval may be occupied by Wi-Fi communications. For example, the BTLE connection interval shown in FIG. 6 includes four BTLE TX/RX pairs, occupying a total of 2.8 ms, followed by Wi-Fi communications, occupying the remaining 12.2 ms of the connection interval. The Bluetooth transceivers in the remote control 514 and/or the digital media player 502 may transition to a sleep state during this portion of the connection interval, e.g., to reduce power consumption. It should be understood that the timings shown in FIG. 6 are exemplary, and other timings may be used.

Figure 7:
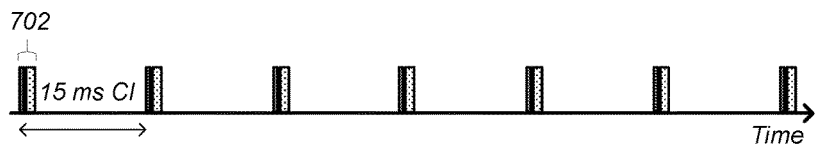
Figure 8:
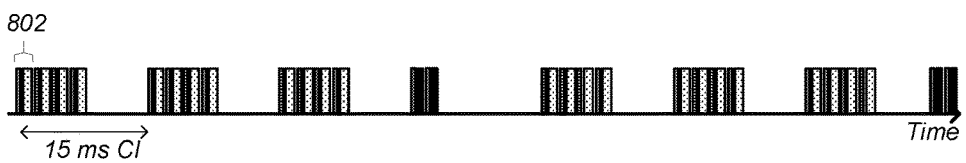
Figure 9:
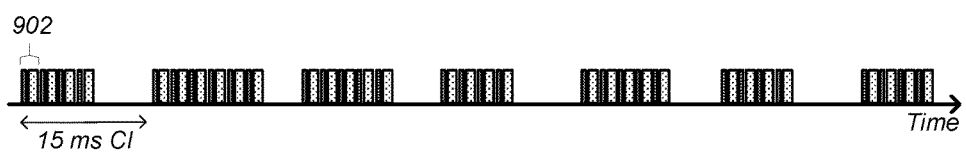

FIG. 7 illustrates scheduling of several BTLE connection intervals in which the remote control 514 is used without voice data. In such a scenario, including one BTLE TX/RX pair (such as the TX/RX pair 702) in each connection interval may be sufficient to communicate data representing physical user inputs (e.g., button presses, trackpad gestures, motion gestures). However, audio input, such as voice commands, may include substantially more data. FIG. 8 illustrates scheduling of several BTLE connection intervals in which the remote control 514 is used with voice input. As shown in FIG. 8, this scenario may communicate four BTLE TX/RX pairs during some connection intervals, to accommodate the additional data representing the voice input. In some scenarios, some connection intervals may include less BTLE TX/RX pairs. For example, as illustrated in FIG. 8, every fourth packet is an empty packet. FIG. 9 illustrates scheduling of several BTLE connection intervals in which the remote control is used with both physical user inputs and voice input. As shown in FIG. 9, this scenario may communicate up to six BTLE TX/RX pairs each connection interval, to accommodate the total input data. In each scenario of FIG. 7-9, some or all of the time remaining in the BTLE connection intervals may be occupied by Wi-Fi communications (not shown).

Figure 10:
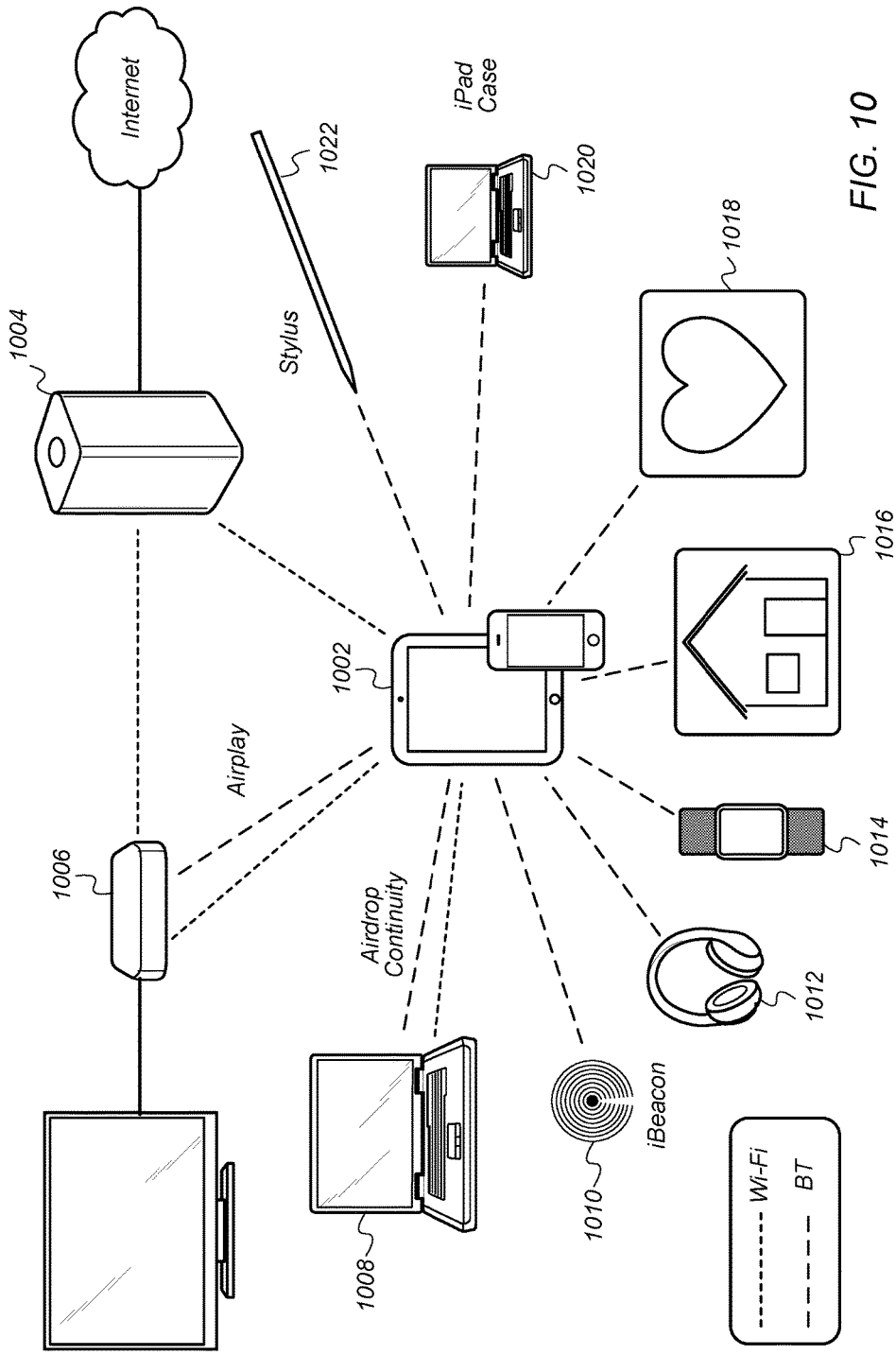
FIG. 10 illustrates an example scenario in which a wireless client station may demand low latency communications with accessory devices in a congested wireless environment, according to some embodiments.

FIG. 10 illustrates another example scenario in which a tablet computer 1002 (e.g., an iPad™) or other touch device may demand (or require) low latency communications with one or more accessory devices in a congested environment. As shown in FIG. 10, the tablet computer 1002 may be or include an example of a wireless client station 106. The tablet computer 1002 may communicate with one or more other wireless stations in a WLAN. For example, the tablet computer 1002 may communicate with an AP 1004, e.g., a gateway to communicate with the Internet. The tablet computer 1002 may communicate with the AP 1004 using, e.g., Wi-Fi. As another example, the tablet computer 1002 may provide data, such as audio/video data, to a local device, such as a digital media player 1006 or laptop computer 1008. The tablet computer 1002 may communicate with the local device 1006 using one or more wireless communication protocols, such as Wi-Fi or Bluetooth.

The tablet computer 1002 may additionally, or alternatively, communicate wirelessly with one or more accessory devices, e.g., using Bluetooth. As shown in FIG. 10, the tablet computer 1002 may wirelessly communicate with iBeacon™ devices 1010, headphones 1012, wearable devices 1014 (e.g., smart watches, smart glasses), home automation sensors 1016, health and fitness sensors 1018, keyboards 1020, and/or styluses 1022 (such as Apple Pencil™, by Apple Inc.), among other possible accessory devices.

A user may expect or demand low latency in communications with one or more of these accessory devices. For example, a user may expect a stylus 1022 to draw on a touch screen of the tablet computer 1002 without noticeable lag; i.e., without a noticeable gap between the tip of the stylus 1022 and a line being drawn, while the stylus 1022 is being moved in relation to the touch surface. In various examples of a stylus 1022, the stylus may produce force data (e.g., from a force sensor on its tip), orientation data (e.g., from a gyroscope), and/or motion data (e.g., from an accelerometer), among other data. In some scenarios, the stylus 1022 may transmit some or all of this data to the tablet computer 1002, e.g., via Bluetooth. Additional, related data may be produced by the tablet computer 1002, such as position data representing where the stylus 1022 is contacting the touch screen of the tablet computer 1002. Communications between the tablet computer 1002 and the stylus 1022 may also include a sync signal, for use in synchronizing data produced by the stylus 1022 with corresponding data produced by the tablet computer 1002. In some scenarios, the tablet computer 1002 may display a line, drawn in real time on a graphical user interface (GUI) of the tablet computer 1002, in response to receiving and processing the data produced by the stylus 1022. Therefore, high latency in communicating such data may cause a delay in drawing the line, resulting in a degraded user experience.

Figure 11:
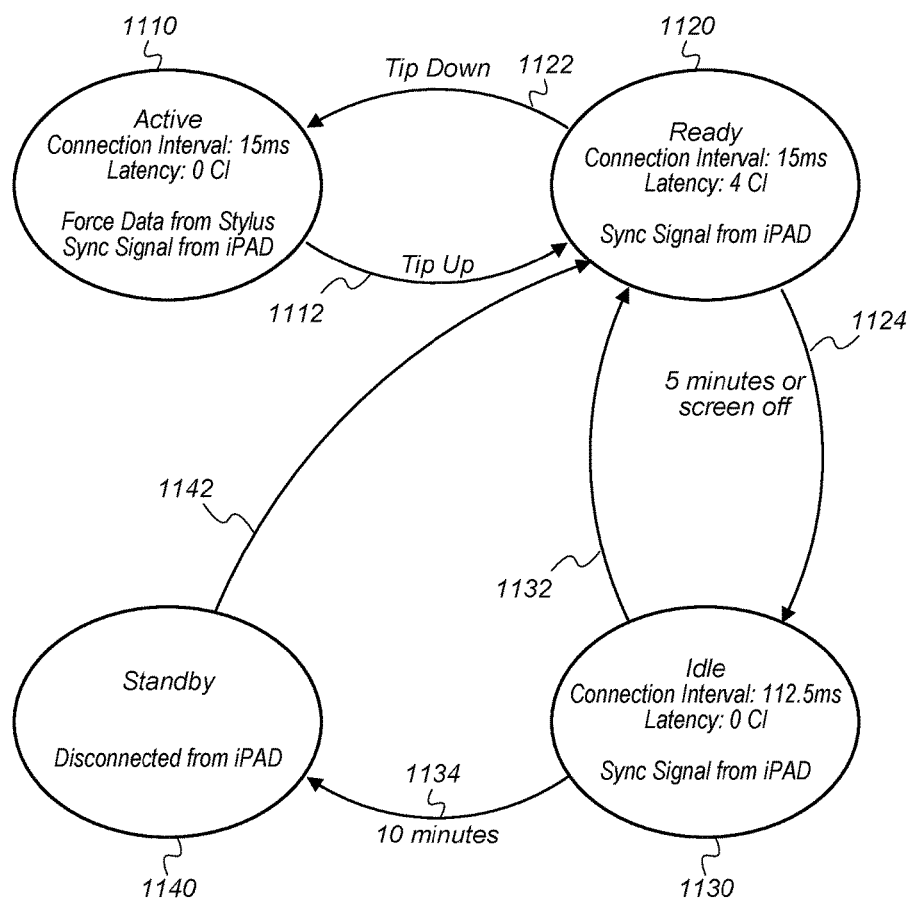
FIG. 11 illustrates an example state diagram for execution by an example stylus, according to some embodiments.

FIG. 11 illustrates a state diagram for execution by an example stylus, such as the stylus 1022. The state machine of FIG. 11 is designed to promote power-savings in the stylus 1022, while remaining responsive to user input. In an Active state 1110, the stylus 1022 may communicate with the tablet computer 1002 via BTLE, with a connection interval of, e.g., 15 ms. The stylus 1022 may communicate with the tablet computer 1002 during every connection interval, or, alternatively, during any connection interval in which the stylus 1022 and/or the tablet computer 1002 has data to communicate, resulting in a latency of 0 connection intervals. For example, in some scenarios, the tablet computer 1002 may transmit a sync signal during every connection interval. Similarly, the stylus 1022 may transmit one or more packets including data representing force data during every connection interval.

While in the Active state 1110, the stylus 1022 may, at 1112, detect that the tip of the stylus 1022 has been raised, e.g., from the touch surface of the tablet computer 1002. For example, the force sensor of the stylus 1022 may indicate that no force is being applied. In response to determining that the tip of the stylus 1022 has been raised, the stylus 1022 may transition to a Ready state 1120. In the Ready state 1120, the stylus 1022 may communicate with the tablet computer 1002 less frequently, e.g., to reduce power consumption. For example, the tablet computer 1002 may transmit the sync signal during every fourth connection interval (i.e., every 60 ms), as opposed to during every connection interval, as in the Active state 1110. In the Ready state 1120, the stylus 1022 may not have data to transmit to the tablet computer 1002.

While in the Ready state 1120, the stylus 1022 may, at 1122, detect that the tip of the stylus 1022 has been placed on the touch surface of the tablet computer 1002 or otherwise oriented in a writing position. For example, the force sensor of the stylus 1022 may indicate that a force is being applied. In response to determining that the tip of the stylus 1022 has been placed on the touch surface or is otherwise "tip down," the stylus 1022 may transition to the Active state 1110. Thus, the stylus 1022 may transition from the Ready state 1120 to the Active state 1110 in 60 ms or less from detecting that the tip of the stylus 1022 has been placed on the touch surface or otherwise oriented "tip down."

While in the Ready state 1120, the stylus 1022 may, at 1124, determine that an idle trigger has occurred. For example, the idle trigger may include the stylus 1022 having remained in the Ready state 1120 for a first predetermined amount of time, such as 5 minutes. As another example, the idle trigger may include the stylus 1022 having been stationary for the first predetermined amount of time, e.g., as determined by a gyroscope and/or accelerometer. As another example, the idle trigger may include the touch screen of the tablet computer 1002 being turned off. In some scenarios, a status of the touch screen may be transmitted by the tablet computer 1002, to allow the stylus 1022 to make such a determination. In response to determining that the idle trigger has occurred, the stylus 1022 may transition to an Idle state 1130. In the Idle state 1130, the stylus 1022 may communicate with the tablet computer 1002 even less frequently than in the Ready state 1120. For example, the connection interval may be increased in length, e.g., to 112.5 ms. The tablet computer 1002 may transmit the sync signal during every connection interval (i.e., every 112.5 ms). In the Idle state 1130, the stylus may not have data to transmit to the tablet computer 1002.

While in the Idle state 1130, the stylus 1022 may, at 1132, detect that the stylus 1022 has been moved, e.g., using the gyroscope and/or accelerometer. In response to determining that the stylus 1022 has been moved, the stylus 1022 may transition to the Ready state 1120.

While in the Idle state 1130, the stylus 1022 may, at 1134, determine that a standby trigger has occurred. For example, the standby trigger may include the stylus 1022 having remained in the Idle state 1130 for a second predetermined amount of time, such as 10 minutes. As another example, the standby trigger may include the stylus 1022 having been stationary for the second predetermined amount of time, e.g., as determined by the gyroscope and/or accelerometer. In response to determining that the standby trigger has occurred, the stylus 1022 may transition to a Standby mode 1140. In the Standby mode 1140, the stylus 1022 may disconnect from the tablet computer 1002. For example, the stylus 1022 may terminate the BTLE session with the tablet computer 1002.

While in the Standby mode 1140, the stylus 1022 may, at 1142, detect that the stylus 1022 has been moved, e.g., using the gyroscope and/or accelerometer. In response to determining that the stylus 1022 has been moved, the stylus 1022 may transition to the Ready state 1120.

It should be understood that the timings shown in FIG. 11 are exemplary, and other timings may be used.

It may be understood that in the preceding use scenarios, for Bluetooth packets containing time-sensitive data, communicating the packets outside of the expected schedule (e.g., bumping a packet to a later connection interval) may result in a degraded user experience. As the 2.4 GHz frequency band becomes increasing congested, such as according to the preceding use scenarios, scheduling such time-sensitive packets becomes more difficult.

Simultaneous Bluetooth/Wi-Fi Communications

In some scenarios, a wireless client station, such as the client station 106, may improve user experience by reducing wireless congestion, by scheduling Wi-Fi communications and Bluetooth communications to occur simultaneously.

As a first example, the client station 106 may schedule Wi-Fi RX operations to coincide with Bluetooth RX operations. In many use scenarios, the client station 106 may receive significantly more data than it sends. Thus, receiving both Wi-Fi signals and Bluetooth signals simultaneously may substantially reduce scheduling conflicts. In some scenarios, the client station 106 may schedule Wi-Fi RX operations and Bluetooth RX operations to coincide in response to determining that both the Wi-Fi RX signal and the Bluetooth RX signal are sufficiently strong (e.g., each has an RSSI value meeting a specified threshold).

Figures 12, 13:
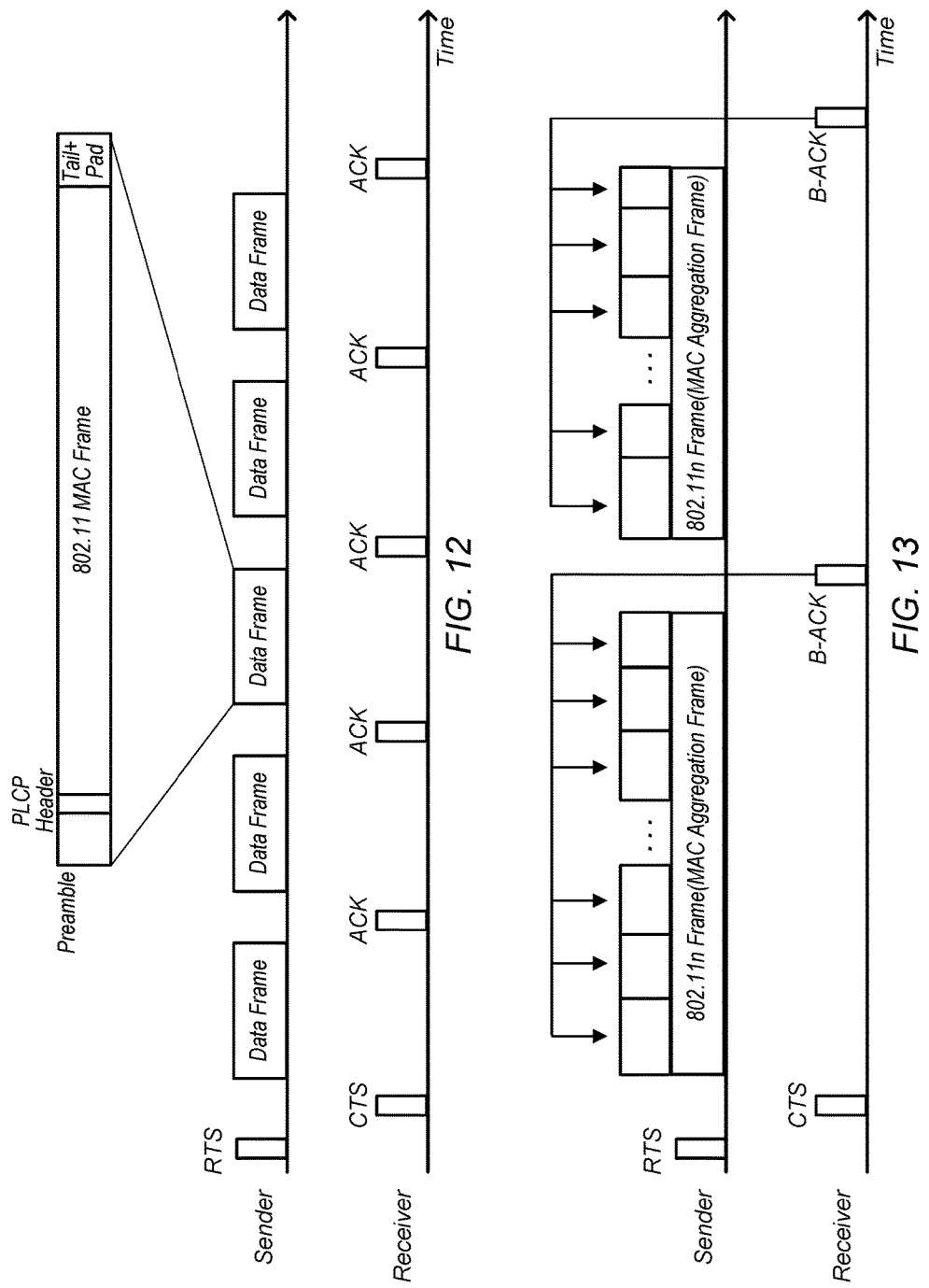
FIG. 12 illustrates an example of a Wi-Fi signal including a series of data frames without frame aggregation, according to some embodiments.
FIG. 13 illustrates an example of a Wi-Fi signal including a series of data frames with frame aggregation, according to some embodiments.

As a second example, the client station 106 may implement Wi-Fi frame aggregation in response to determining that Bluetooth bandwidth is below a certain threshold. FIGS. 12-13 illustrate the advantages of Wi-Fi frame aggregation.

FIG. 12 illustrates an example of a Wi-Fi signal including a series of data frames without frame aggregation. As illustrated, a sender (e.g., an AP, such as the AP 112) may transmit a Request-to-Send frame (RTS), followed by the series of data frames (e.g., MAC frames). Following each data frame, the sender waits to receive an acknowledge frame (ACK) confirming receipt of the data frame before transmitting the next data frame. A receiver (e.g., a client station, such as the client station 106) may respond to the RTS by transmitting a Clear-to-Send frame (CTS). The receiver may respond to each data frame by sending an ACK. Thus, each device transitions at relatively short intervals between transmitting and receiving. In some scenarios, such as when Bluetooth bandwidth meets or exceeds a certain threshold, the sender and receiver may perform Wi-Fi communications without frame aggregation, as illustrated in FIG. 12, without unacceptably impacting Bluetooth latency.

FIG. 13 illustrates an example of a Wi-Fi signal including a series of data frames with frame aggregation. As illustrated, the sender may transmit a RTS, followed by a series of aggregation frames, which may each include a plurality of data frames. Thus, each aggregation frame may include an equivalent amount of data as a plurality of the data frames of FIG. 12. Following each aggregation frame, the sender waits to receive a block acknowledge frame (B-ACK) confirming receipt of each of the data frames included in the aggregation frame before transmitting the next aggregation frame. The receiver may respond to the RTS by transmitting a CTS. The receiver may respond to each aggregate frame by sending a B-ACK. Thus, the receiver may transmit less frequently than in the scenario of FIG. 12, and the data may be transferred more efficiently, as less time is wasted in transitioning between TX and RX states.

In some scenarios, the client station 106 may implement Wi-Fi frame aggregation only in response to determining that Bluetooth bandwidth is below a certain threshold, to ensure that each Bluetooth connection interval contains sufficient open time (i.e., time when no Bluetooth communications are occurring) to allow for a Wi-Fi aggregate frame.

As a third example, the client station 106 may dynamically modify Wi-Fi transmit power in response to determining that Bluetooth communications are occurring. For example, in a scenario in which the client station 106 has scheduled Wi-Fi RX operations to coincide with Bluetooth RX operations, a sending Wi-Fi station (e.g., an AP, such as the AP 112) may expect the client station 106 to transmit an ACK or B-ACK in response to one or more data frames received by the client station 106, while the client station 106 is still receiving Bluetooth communications. The client station 106 may determine a reduced (e.g., a minimum) power level that may be used to reliably communicate with the sending Wi-Fi station, and may transmit the ACK or B-ACK at the determined reduced power level. This may reduce the interference caused to the ongoing Bluetooth communications.

As a fourth example, the client station 106 may coordinate channel use between Wi-Fi communications and concurrent Bluetooth communications. For example, a Wi-Fi radio within the client station 106 (e.g., within the wireless communication circuitry 329) may provide to a Bluetooth radio within the client station 106 (e.g., within the wireless communication circuitry 329) timing and/or channel information of current and/or upcoming Wi-Fi communications. For example, the Wi-Fi radio may identify a set of channels that will be occupied during an identified window of time. In response to receiving the timing and/or channel information, the Bluetooth radio may implement a channel-hopping schedule configured to skip channels occupied by Wi-Fi communications. For example, the implemented channel-hopping schedule may exclude the identified set of channels during the identified window of time. This may preserve real-time frequency diversity between the Wi-Fi communications and the Bluetooth communications, which may reduce interference between the two.

Figure 14:
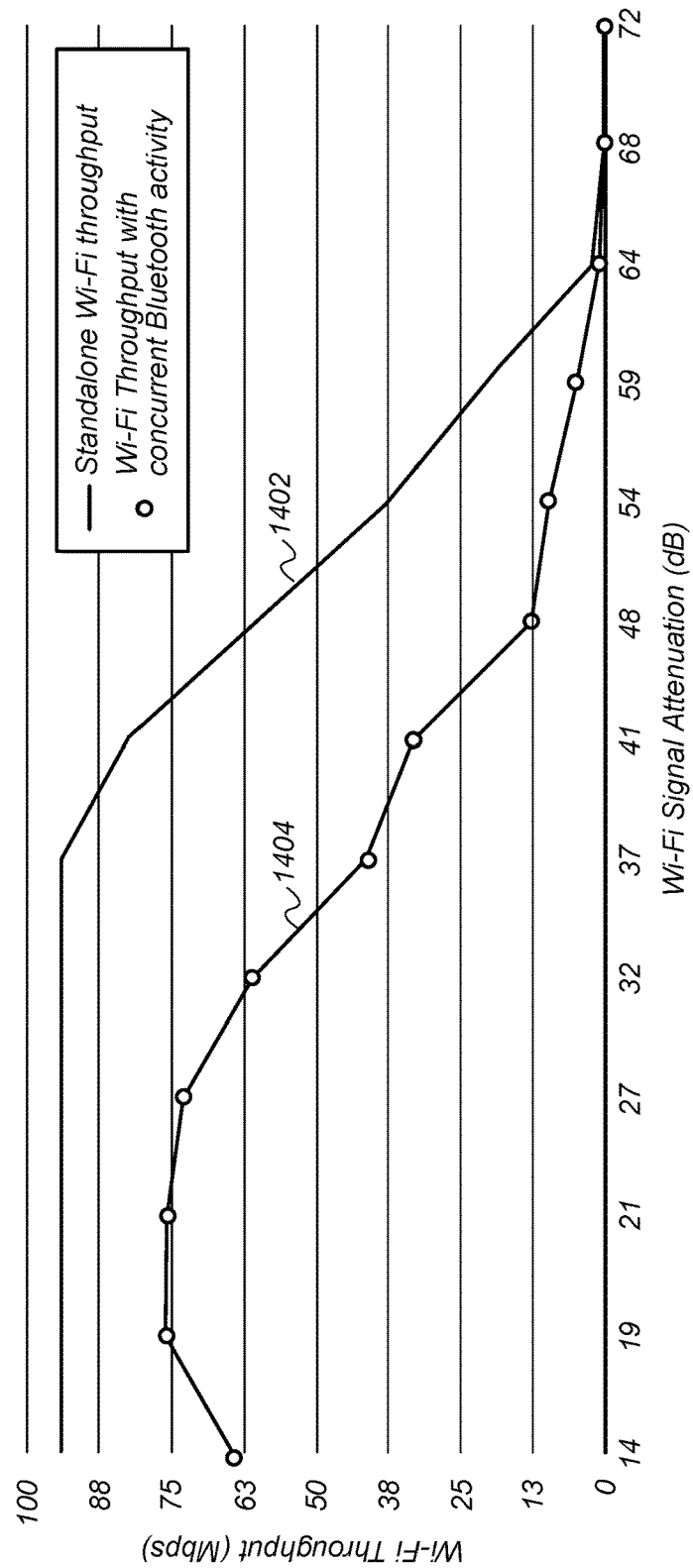
FIG. 14 illustrates experimental performance characteristics of a Wi-Fi station implementing features for prioritizing time-sensitive packets, according to some embodiments.

FIG. 14 illustrates experimental performance characteristics of a Wi-Fi station implementing the features described in the preceding four examples. Specifically, FIG. 14 illustrates throughput (in Mbps) received at a Wi-Fi station across a range of signal attenuation. Curve 1402 illustrates Wi-Fi throughput received by the Wi-Fi station in the absence of Bluetooth signals. Curve 1404 illustrates Wi-Fi throughput received by the Wi-Fi station while the Wi-Fi station concurrently communicated via Bluetooth with a BTLE remote control, a Bluetooth headset, and a Bluetooth game controller. FIG. 14 illustrates that the preceding four examples improve Wi-Fi performance over the prior art in environments congested with Bluetooth communications that might otherwise substantially reduce Wi-Fi throughput.
Reduced BTLE Delay When packets are available to be received or transmitted between a client station, such as the client station 106, and one or more other wireless devices, the client station 106 may schedule transmission of the packets based at least in part on prioritization of packet types or sources. For example, within a Bluetooth connection interval, the client station may assign to each accessory device one or more time slots for TX and RX communications. If a high-priority accessory device requires additional communication time, the client station may reallocate one or more slots from a lower-priority accessory device.

In the past, some types of Bluetooth packets have been treated as low-priority packets. For example, BTLE packets have historically been treated as low-priority packets because they have typically been used for non-time-sensitive applications, such as sensor data. However, this may lead to unacceptable latency if the BTLE packets include time-sensitive data, such as voice commands or stylus input.

In some scenarios, a wireless client station, such as the client station 106, may improve a user experience by reducing delay of BTLE packets generally, or high-priority BTLE packets in particular. The client station 106 may identify packets as high-priority packets in any of a variety of ways. In some scenarios, the client station 106 may treat all packets from a certain accessory device, or a certain class of accessory devices, as high-priority. For example, the client station 106 may treat packets from a remote control, a stylus, or a game controller as high-priority. In other scenarios, the client station 106 may treat packets from a certain accessory device, or a certain class of accessory devices, as high-priority if certain conditions are met. For example, the client station 106 may treat packets from a stylus as high priority while the stylus is in a low-latency mode, such as the Active state and/or Ready state, as defined above with regard to FIG. 11. Similarly, the client station 106 may treat packets from a remote control as high-priority while a microphone of the remote control is active for receiving voice commands. In other scenarios, the client station 106 may treat packets as high-priority if the packets include a specified type of data, such as voice data, or if the packets are configured according to a specified Bluetooth profile. In yet other scenarios, the client station 106 may treat all BTLE packets as high-priority.

In some embodiments, the client station may treat packets as high-priority if a specified one of the foregoing criteria, or any specified combination of the foregoing criteria, are satisfied, and may not treat packets as high-priority (e.g., may treat packets as low-priority) if the specified criteria are not satisfied. In some embodiments, the client station 106 may treat packets as high-priority, according to any one or more of the foregoing criteria, in response to determining that the 2.4 GHz frequency band is congested. For example, the client station may treat packets as high-priority in response to determining that at least a threshold number of accessory devices are communicating via Bluetooth with the client station 106, or in the vicinity of the client station 106.

Table 2 lists several examples of how delay may be reduced for high-priority packets, any or all of which may be used singly or in combination.

TABLE 2

Options for Reducing BTLE Latency and improving Connectivity Robustness

| | | |
|---|---|---|
| Option 1 | BT remote/voice command packets have the highest priority for all BT packets | BT FW |
| Option 2 | When voice commands and A2DP are active at the same time, pause A2DP | BT host |
| Option 3 | Reduce A2DP data rate | BT host |
| Option 4 | Extend data packet size for BTLE | BT FW |
| Option 5 | Never deny any BTLE remote/voice command packets | Wi-Fi ucode |
| Option 6 | Remote will not go to sleep until it receives ACK from client station | BT FW in remote |

As a first option, the client station 106 may prioritize high-priority Bluetooth packets while scheduling reception of packets. In some embodiments, the prioritized Bluetooth packets may be BTLE packets. FIGS. 15A-15B illustrate effects of this first option.

FIG. 15A-15B illustrate a variety of communications received by the client station 106, as time progresses from left to right. As shown, one or more BTLE packets (1510-1518) may be available to be received or transmitted by the client station 106 during each Bluetooth connection interval. The scenarios illustrated are consistent with the scenario of FIG. 8, in which four BTLE TX/RX pairs including voice data are available from a remote control during each 15 ms connection interval. A plurality of Wi-Fi packets (1520-

1522) and audio packets (1530-1532), such as Advanced Audio Distribution Profile (A2DP) packets, are also available to be received or transmitted by the client station 106 at various times.

FIG. 15A illustrates a scenario in which BTLE packets are processed as low-priority packets. As shown, the client station 106 receives or transmits one or more BTLE packets 1510 during a first Bluetooth connection interval. Near the end of the first connection interval, one or more A2DP packets 1530 become available, and are transmitted by the client station 106, extending into a second Bluetooth connection interval. Therefore, BTLE packets 1512 are not scheduled to be received or transmitted during the second connection interval, although they would have been scheduled to be received or transmitted at that time in the absence of the higher-priority A2DP packets 1530. Because A2DP packets support real-time audio playback, A2DP packets are commonly given higher priority. Near the end of the second connection interval, one or more Wi-Fi packets 1522 become available, and are received or transmitted by the client station 106, extending into a third Bluetooth connection interval. Therefore, BTLE packets 1514 are not received or transmitted during the third connection interval, although they would have been scheduled to be received or transmitted at that time in the absence of the higher-priority Wi-Fi packets 1522. During a fourth connection interval, the client station 106 receives or transmits one or more BTLE packets 1516. Thus, the client station 106 has experienced an effective BTLE connection interval of 45 ms, rather than the expected 15 ms. The data that would have been included in the BTLE packets 1512 and/or 1514 may be dropped, or may be delayed for inclusion in BTLE packets 1516 and/or BTLE packets 1518. This delay may cause a delay in processing and execution of time-sensitive input, such as voice commands or stylus input, which may result in an unacceptable user experience.

FIG. 15B illustrates a scenario in which BTLE packets are processed as high-priority packets. In some scenarios, all BTLE packets may be processed as high-priority packets, while in other scenarios, only those BTLE packets from certain sources, such as from a stylus, or only those BTLE packets including certain types of data, such as voice commands or stylus inputs, may be processed as high-priority data. As shown, the client station 106 receives or transmits one or more BTLE packets 1510 during the first Bluetooth connection interval. Near the end of the first connection interval, the A2DP packets 1530 become available. However, the client station 106 prioritizes the BTLE packets above A2DP or Wi-Fi packets. Therefore, the client station 106 delays the A2DP packets 1530 until after reception or transmission of the BTLE packets 1512. The A2DP packets 1530 are scheduled for transmission during an open portion of the second connection interval. Such prioritization of one type of Bluetooth packets over another type of Bluetooth packets may be performed, e.g., in firmware of the Bluetooth radio of the client station 106. Near the end of the second connection interval, one or more Wi-Fi packets 1522 become available, and a subset of the Wi-Fi packets 1522 is received or transmitted by the client station 106. However, because the BTLE packets 1514 are prioritized above the Wi-Fi packets 1522, the client station 106 schedules reception or transmission of the BTLE packets 1514 at the start of the third connection interval, interrupting reception or transmission of the Wi-Fi packets 1522. The remainder of the Wi-Fi packets 1522 is scheduled for reception or transmission during an open portion of the third connection interval. Thus, the BTLE packets are received or transmitted without delay, while Wi-Fi packets or other Bluetooth packets are scheduled for reception or transmission during remaining time slots. This may improve the user experience by reducing latency in time-sensitive BTLE communications.

Such prioritization of Bluetooth packets over Wi-Fi packets may include communication between Bluetooth processing components and Wi-Fi processing components. For example, a Bluetooth baseband processor may communicate to a Wi-Fi baseband processor various information, such as timing of Bluetooth connection intervals and whether Bluetooth packets are scheduled for transmission during a particular connection interval. In response, the Wi-Fi baseband processor may interrupt reception or transmission of Wi-Fi packets.

As a second option, the client station 106 may prioritize high-priority Bluetooth packets over other Bluetooth packets by disabling one or more Bluetooth functions while another Bluetooth function is active. For example, in response to determining that high-priority Bluetooth packets are available, the client station 106 may temporarily disable one or more other types of Bluetooth communications, such as A2DP packets. Thus, the other types of Bluetooth communications would not conflict with the high-priority packets. In some embodiments, time slots previously scheduled for the disabled Bluetooth communications within a connection interval may be reallocated for the high-priority packets. In some embodiments, the client station 106 may additionally pause a function acting as a source of the disabled Bluetooth communications, such as music player software.

As a third option, the client station 106 may prioritize high-priority Bluetooth packets over other Bluetooth packets by reducing the data rate of the other Bluetooth packets. For example, in response to determining that high-priority Bluetooth packets are available, the client station 106 may temporarily encode the A2DP data with a reduced data rate.

As a fourth option, the client station 106 may extend the data packet size for high-priority BTLE communications. For example, for certain types of data, such as voice command data, the data may be included in BTLE packets having a length extension, as shown in Table 1, above. This may result in a higher application data rate than can be achieved using BTLE packets without a length extension. The length extension may be performed, e.g., in firmware of the Bluetooth radio of the client station 106.

As a fifth option, the client station 106 may be configured to avoid denying any high-priority Bluetooth packets. For example, if the client station 106 is reallocating time slots within a connection interval from low-priority packets to high-priority packets, the client station may be configured to not reallocate time slots allocated to other high-priority packets. As a specific example, the client station 106 may not reallocate time slots, e.g., for Wi-Fi packets or A2DP packets, if the time slots are currently allocated to a certain type of accessory device, such as a stylus or remote control. As another example, the client station 106 may be configured to not reallocate time slots allocated to a certain type of accessory device under certain conditions, such as to a stylus while the stylus is in a low latency mode, such as the Active state and/or Ready state, as defined above with regard to FIG. 11, or to a remote control, while a microphone of the remote control is active for receiving voice commands.

As a sixth option, an accessory device may remain in an active state following transmission of a packet, e.g., a polling response packet, until it receives an ACK from the client station 106. FIGS. 16A-16C illustrate the effects of this option. FIGS. 16A-16C illustrate three Bluetooth communication scenarios between a master device (e.g., the client station 106) and a slave device (e.g., an accessory device), as time progresses from left to right. Specifically, FIGS. 16A-16C illustrate scenarios in which the slave device currently has no data to communicate to the master device. In such scenarios, the slave device may transition to a sleep state to reduce power consumption. However, if a predetermined length of time ("timeout period") passes during which the master device receives no communication from the slave device, e.g., in response to polling messages from the master device, then the Bluetooth connection between the master device and the slave device may lapse; i.e., the master device may terminate the Bluetooth connection with the slave device in response to determining that the predetermined length of time has expired. Following termination of the Bluetooth connection, further data transfer from the slave device to the master device requires reestablishment of the connection, which may introduce a noticeable delay, thus degrading the user experience. Therefore, the slave device may periodically transition from the sleep state to an active state to transmit one or more packets to the master device. The slave device may then return to the sleep state. This polling-response process may thus prevent the Bluetooth connection from lapsing.

FIG. 16A illustrates an example scenario in which the polling-response process is carried out successfully. As shown, the master device transmits an ACK 1602. The ACK 1602 may include acknowledgement of receipt of a frame previously transmitted by the slave device, and/or a polling request, requesting a response from the slave device, e.g., to prevent the Bluetooth connection from lapsing. In response to receiving the ACK 1602, the slave device transmits a response packet (RSP) 1604. The RSP 1604 may indicate to the master device that the slave device is still maintaining the Bluetooth connection with the master device. Following transmission of the RSP 1604, the slave device transitions to the sleep state for a predetermined period of time (e.g., 1.2 seconds), without waiting for additional communications from the master device. For example, the ACK 1602 and the RSP 1604 may be transmitted during a Bluetooth connection interval, and the slave device may transition to the sleep state immediately following the connection interval, or immediately following a portion of the connection interval scheduled for use by the slave device, or immediately following transmission of the RSP 1604.

In response to receiving the RSP 1604, the master device may transmit an ACK 1606, acknowledging receipt of the RSP 1604. However, the slave device does not receive the ACK 1606, because the slave device is in the sleep state. The master device periodically transmits ACK frames acknowledging receipt of the RSP 1604 and/or requesting a response from the slave device.

In response to determining that the predetermined period of time has expired, the slave device transitions to the active state. While in the active state, the slave device receives an ACK 1608, transmitted by the master device. In response to receiving the ACK 1608, the slave device transmits another RSP 1610. This process may continue in like manner until interrupted, e.g., if either the master device or the slave device transmits data packets, if the connection is terminated, etc.

FIG. 16B illustrates an example scenario in which the polling-response process is attempted, but wherein communication failure occurs. As shown, the master device transmits an ACK 1622, similar to the ACK 1602 of FIG. 16A. In response to receiving the ACK 1622, the slave device transmits a RSP 1624, similar to the RSP 1604 of FIG. 16A. Following transmission of the RSP 1624, the slave device transitions to the sleep state for a predetermined period of time (e.g., 1.2 seconds), without waiting for additional communications from the master device, as in the scenario of FIG. 16A. However, in the scenario of FIG. 16B, the master device does not receive the RSP 1624, e.g., due to interference or insufficient signal strength.

In response to not receiving the RSP 1624 within an expected window of time, the master device transmits a no-acknowledge packet (NAK) 1626. However, the slave device does not receive the NAK 1626, because the slave device is in the sleep state. The master device periodically transmits NAK frames reporting that no RSP was received, and/or requesting a response from the slave device.

In response to determining that the predetermined period of time has expired, the slave device transitions to the active state. While in the active state, the slave device receives a NAK 1628, transmitted by the master device. In response to receiving the NAK 1628, the slave device transmits another RSP 1630, and transitions back to the sleep state. However, the master device again fails to receive the RSP 1630, and responds by transmitting another NAK 1632. In a poor wireless environment (e.g., a congested, noisy, or long-range environment) this process may continue in like manner until the master device determines that the timeout period has passed without receiving a communication from the slave device, at which time the master device may terminate the Bluetooth connection between the master device and the slave device. Thus, the polling-response process may fail to prevent the Bluetooth connection from lapsing in a poor wireless scenario.

FIG. 16C illustrates an example scenario in which the polling-response process is attempted, and is then adjusted in response to communication failure, according to the sixth option. As shown, similar to FIG. 16B, the master device transmits an ACK 1642, prompting the slave device to transmit a RSP 1644. Similar to the scenario of FIG. 16B, following transmission of the RSP 1644, the slave device transitions to the sleep state for a predetermined period of time (e.g., 1.2 seconds), without waiting for additional communications from the master device, but the master device does not receive the RSP 1644, e.g., due to interference or insufficient signal strength. Similar to the scenario of FIG. 16B, when the slave device transitions back to the active state and receives a NAK 1648, the slave device transmits an RSP 1650, which is not received by the master device, prompting another NAK 1652.

As shown, in response to determining that the predetermined period of time has again expired, the slave device transitions to the active state. While in the active state, the slave device receives a second NAK 1654 (i.e., the NAK 1654 is the second NAK received by the slave device, although other NAKs may have been transmitted). In response to receiving the second NAK 1654 (i.e., in response to receiving two NAKs consecutively), the slave device may transmit an RSP 1656, and may then remain in the active state to await an ACK, rather than transitioning to the sleep state, as in the scenario of FIG. 16B. In the scenario of FIG. 16C, the master device does not receive the RSP 1656, and the master device therefore transmits another NAK 1658. In response to receiving the NAK 1658, the slave device again transmits an RSP 1660, and remains in the active state to await an ACK. The slave device thus continues to transmit RSPs in response to each subsequent NAK received, without transitioning back to the sleep state. In the scenario of FIG. 16C, the master device receives the RSP 1660, and responds by transmitting an ACK 1662. In response to receiving the ACK 1662, the slave device transitions to the sleep state for a predetermined period of time (e.g., 1.2 seconds). This polling-response process, modified according to the sixth option, may thus prevent the Bluetooth connection from lapsing, even in poor wireless environments. This may avoid a delay in transmitting subsequent time-sensitive packets that may be incurred by the need to reestablish the Bluetooth connection between the master device and the slave device.

In other scenarios, the slave device may be configured to remain in the active state (i.e., until receiving an ACK) in response to receiving some other number of NAKs consecutively (as opposed to receiving two NAKs consecutively, in the example of FIG. 16C), such as in response to receiving 1 NAK or 3 NAKs. Alternatively, the slave device may be configured to remain in the active state (i.e., until receiving an ACK) following each RSP, without first receiving a NAK. The polling-response process, including the modifications of the sixth option, may be controlled, e.g., in firmware of the Bluetooth radio of the slave device (e.g., an accessory device).

By applying one or more of the options of Table 2, delay in communicating time-sensitive Bluetooth packets may be reduced to a level that is not noticeable to a user.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for communicating data packets, the method comprising:
at a client station:
establishing communications with a plurality of accessory devices;
determining that communications with a first accessory device of the plurality of accessory devices comprise time-sensitive communications;
prioritizing, responsive to the determining, the communications with the first accessory device, wherein prioritizing the communications is further in response to determining that the plurality of accessory devices meets at least a threshold number of accessory devices; and
determining that communications with another accessory device of the plurality of accessory devices comprise Advanced Audio Distribution Profile (A2DP) packets;
wherein the prioritizing the communications with the first accessory device further comprises pausing the A2DP packets until the first accessory device has completed transmitting its available data.

2. The method of claim 1, wherein determining that the communications with the first accessory device comprises time-sensitive communications further comprises:
determining that the first accessory device comprises a remote control configured to provide control input to the client station.

3. The method of claim 2, wherein determining that the communications with the first accessory device comprise time-sensitive communications further comprises:
determining that a microphone of the remote control is active for receiving voice commands.

4. The method of claim 2, wherein determining that the communications with the first accessory device comprise time-sensitive communications further comprises:
determining that the communications with the first accessory device comprise audio data.

5. The method of claim 1, wherein determining that the communications with the first accessory device comprise time-sensitive communications further comprises:
determining that the first accessory device comprises a stylus.

6. The method of claim 5, wherein determining that the communications with the first accessory device comprise time-sensitive communications further comprises:
determining that the stylus is in a low-latency mode.

7. The method of claim 1, wherein prioritizing the communications with the first accessory device further comprises:
scheduling one or more packets of the communications with the first accessory device during successive connection intervals; and
delaying one or more packets corresponding to communications with another accessory device of the plurality of accessory devices.

8. The method of claim 7, wherein delaying one or more packets further comprises:
delaying one or more packets of Wi-Fi communications between a Wi-Fi access point and the client station.

9. The method of claim 1, wherein prioritizing the communications further comprises:
by the client station:
reducing a data rate of the A2DP packets.

10. The method of claim 1, further comprising:
by the client station:
receiving a communication packet from the first accessory device; and
transmitting an acknowledgement packet in response to the received communication packet, wherein the first accessory device is configured to remain in an active state until receiving the acknowledgement packet.

11. A wireless station, comprising:
at least one antenna;
at least one radio configured to perform wireless communication with a plurality of accessory devices;
at least one processing element communicatively coupled to the at least one radio, wherein the at least one processing element is configured to cause the wireless station to:
 establish communications with a plurality of accessory devices;
 determine that communications with a first accessory device of the plurality of accessory devices comprise Bluetooth Low Energy (BTLE) communications communicating input from an interface requiring real-time response; and
 prioritize, responsive to the determining, the communications with the first accessory device over communications with at least an other accessory device of the plurality of accessory devices, wherein the prioritizing is further in response to determining that the plurality of accessory devices meets at least a threshold number of accessory devices; and
 determining that communications with another accessory device of the plurality of accessory devices comprises Advanced Audio Distribution Profile (A2DP) packets;
 wherein the prioritizing the communications with the first accessory device comprises
  performing at least one of:
   pausing the A2DP packets until the first accessory device has completed sending its available data; or
   reducing a data rate of the A2DP packets.

12. The wireless station of claim 11, wherein the at least one processing element is further configured to cause the wireless station to:
 delay one or more packets of Wi-Fi communications between the other accessory device and the wireless station to allow for scheduling of the time-sensitive BTLE communications with the first accessory device.

13. A non-transitory computer-readable medium storing software instructions executable by one or more processors of a wireless communications device, wherein the instructions are configured to cause the wireless communications device to:
 establish communications with a plurality of accessory devices;
 determine that communications with a first accessory device of the plurality of accessory devices comprise time-sensitive communications; and
 prioritize the communications with the first accessory device, responsive to the determining, and further in response to determining that the plurality of accessory devices meets at least a threshold number of accessory devices; and
 determine that communications with another accessory device of the plurality of accessory devices comprise Advanced Audio Distribution Profile (A2DP) packets;
 wherein prioritizing the communications with the first accessory device further comprises performing at least one of:
  pause the A2DP packets until the first accessory device has completed sending its available data; or
  reduce a data rate of the A2DP packets.

14. The non-transitory computer-readable medium of claim 13, wherein the pausing the A2DP packets comprises pausing a function acting as a source of the A2DP packets.

15. The non-transitory computer-readable medium of claim 13, wherein prioritizing the communications with the first accessory device further comprises:
 scheduling one or more packets of the communications with the first accessory device during successive connection intervals; and
 delaying one or more packets corresponding to communications with another accessory device of the plurality of accessory devices.

16. The method of claim 1, wherein the pausing the A2DP packets comprises pausing a function acting as a source of the A2DP packets.

17. The method of claim 1, wherein the pausing the A2DP packets is in response to determining both that the communications with another accessory device comprise A2DP packets and that the communications with the first accessory device comprise audio input.

18. The wireless station of claim 11, wherein the pausing the A2DP packets comprises pausing a function acting as a source of the A2DP packets.

19. The wireless station of claim 11, wherein the pausing the A2DP packets is performed in response to determining both that the communications with another accessory device comprise A2DP packets and that the communications with the first accessory device comprise audio input.

20. The non-transitory computer-readable medium of claim 13, wherein the pausing the A2DP packets is performed in response to determining both that the communications with another accessory device comprise A2DP packets and that the communications with the first accessory device comprise audio input.

* * * * *